C. M. KNUTSON.
SEED POTATO CUTTER AND GRADER.
APPLICATION FILED DEC. 6, 1921.
1,438,922.
Patented Dec. 12, 1922.
2 SHEETS—SHEET 1.
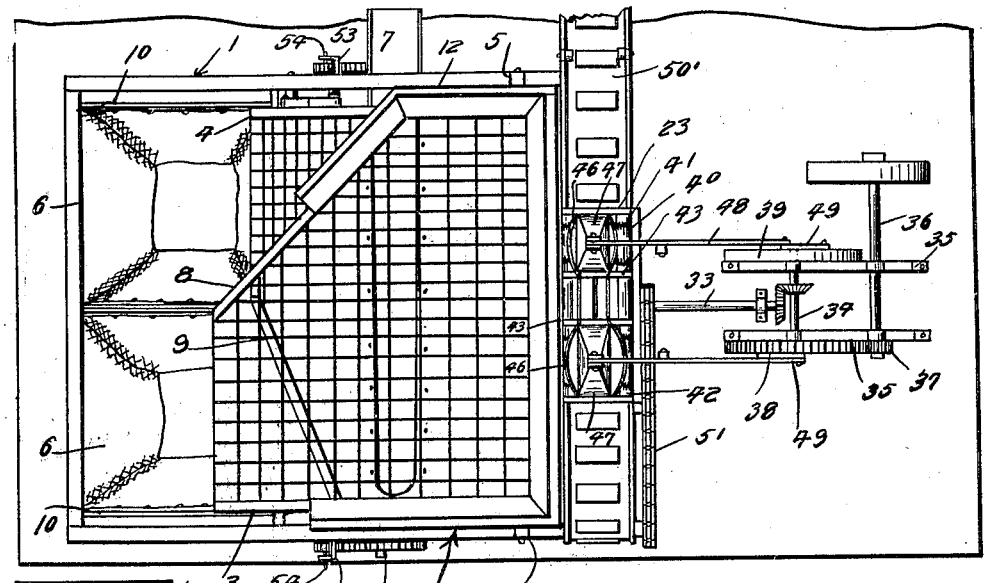
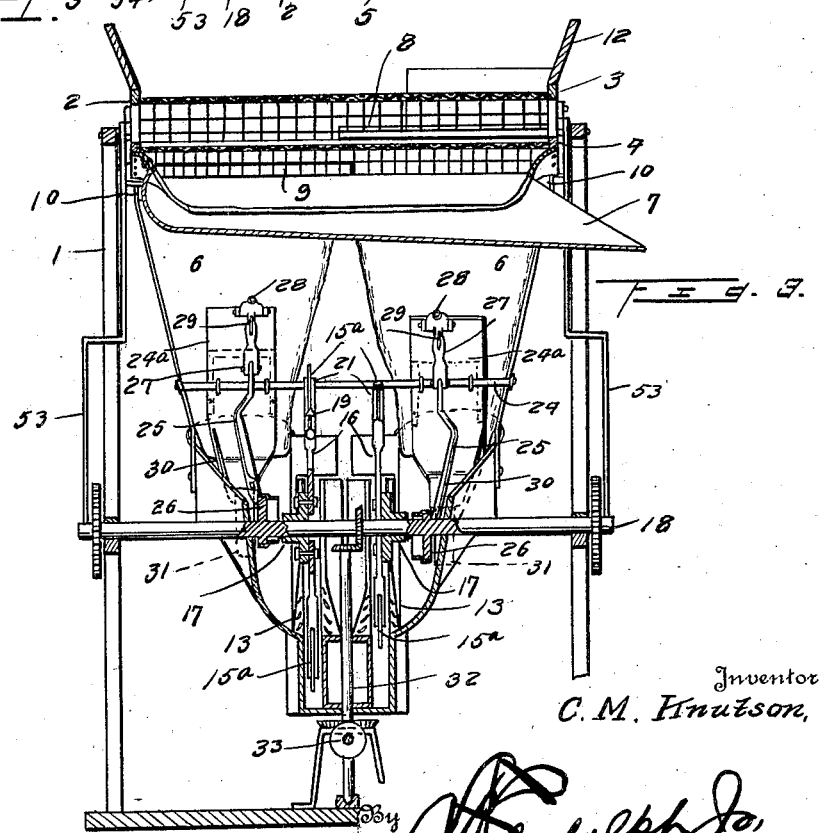
Inventor
C. M. Knutson,
By 
Attorney

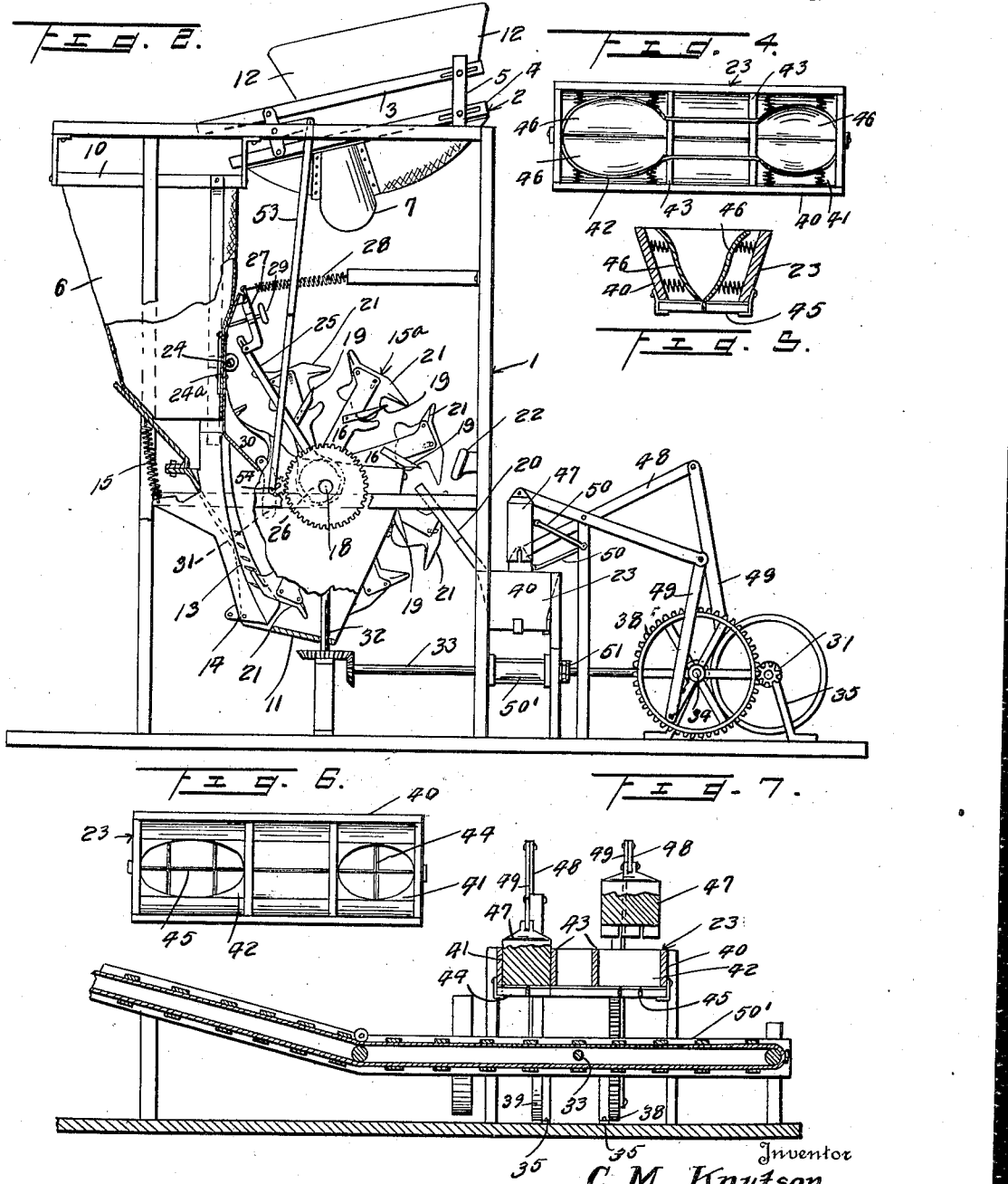

Patented Dec. 12, 1922.

1,438,922

UNITED STATES PATENT OFFICE.

CHRIS M. KNUTSON, OF ADAMS, MINNESOTA.

SEED-POTATO CUTTER AND GRADER.

Application filed December 6, 1921. Serial No. 520,326.

*To all whom it may concern:*

Be it known that I, CHRIS M. KNUTSON, a citizen of the United States, residing at Adams, in the county of Mower and State of Minnesota, have invented certain new and useful Improvements in Seed-Potato Cutters and Graders; and I do hereby declare the following to be a full, clear, and exact description of the invention, such as will enable others skilled in the art to which it appertains to make and use the same.

The object of the invention is to provide a simple, compact, and efficient seed potato grading and cutting machine into which the potatoes of all sizes may be deposited and whereby the potatoes are separated and graded according to sizes, eliminating or discharging those which are below a certain prescribed size and sorting the others and conducting them respectively to cutting or slicing means whereby they are reduced to the proper condition for planting, the apparatus being such as to be adapted, according to the size and capacity thereof, to be operated either manually or by power as from a motor.

With these and other objects in view as will become more apparent as the description proceeds, the invention consists in certain novel features of construction, combination and arrangement of parts as will be hereinafter more fully described and claimed.

For a complete understanding of my ventiton, reference is to be had to the following description and accompanying drawings in which:—

Figure 1 is a top plan view illustrating a seed potato grading and cutting machine constructed in accordance with my invention, Figure 2 is a side elevation partly in sectional illustrating the same, Figure 3 is a transverse sectional view illustrating the device, Figure 4 is a plan view, illustrating the knives, Figure 5 is a transverse sectional view illustrating the same, Figure 6 is a plan view illustrating the knives with the guards removed, Figure 7 is a fragmentary transverse sectional view, illustrating the conveyor for the cut or severed potatoes.

Referring in detail to the drawings, the numeral 1 indicates a supporting frame carrying at its upper end a grading mechanism 2, that includes primary and secondary grading screens 3 and 4 that are pivotally and slidably connected to standards 5 on the frame 1, and said screens are arranged on inclined planes so that the potatoes will roll off of the screens into hoppers 6.

The primary screen is adapted to direct the large size of potatoes into one of the hoppers 6 while the smaller potatoes fall onto the secondary screen and the medium size potatoes are directed into the other hopper 6 while the small size potatoes fall through the secondary screen into a chute or trough 7 and are deposited to one side of the machine and into a suitable receptacle if desired. The primary screen 3 is provided with a deflecting plate 8 for directing the large size potatoes into the respective hopper while the secondary screen 4 is provided with a deflecting plate 9 to direct the intermediate size potatoes into the respective hopper 6. The hoppers 6 are constructed from canvas or similar material and have their upper ends supported by frames 10 carried by the support 1 so that the discharge ends of the screens 3 and 4 will be disposed over the upper ends of the hoppers and the hoppers taper towards their lower ends and are received by magazines 11, carried by the frame 1 under the grading mechanism. A main hopper 12 is provided for directing the potatoes onto the primary screen 3.

The magazines 11 have concaves 13 pivoted thereto as shown at 14 while the other ends of said concaves are associated with the hoppers 6 and are yieldably supported by tension means 15. Pickers 15$^a$ are rotatably mounted in the magazines 11 and the concaves 13 are adapted to yield to permit the pickers to impale potatoes when in the vicinity of the discharge ends of the hoppers 6. The pickers 15$^a$ are in the form of radially extending arms 16 secured at their inner ends to hubs 17 secured to a rotatable shaft 18 journaled to the frame 1 and the magazines. The arms adjacent to their outer ends carry impaling pins 19 and adapted to pick up the potatoes from the magazines and carry them to chutes 20 carried by the frame 1. Ejecting heads 21 are pivoted to the outer ends of the arms 16 and are adapted to engage a trip or stop 22 carried by the frame 1 during the rotation of the arms for the purpose of removing the potatoes from the impaling pins when the latter reach a point adjacent to the troughs 20 so that the potatoes will slide down the trough into a cutting mechanism 23.

A supporting rod 24 is carried by the frame 1 to which is pivoted gates 24ᵃ that engage the hoppers 6 for the purpose of agitating the potatoes in said hoppers and the plates are rocked upon their pivots by rods 25 that receive reciprocatory motion by being connected to cams or eccentrics 26 secured to the shaft 18. The upper ends of the rods 25 have pin and slot connections to arms 27 that are pivoted to the gates 24ᵃ and also connected to tension springs 28. The arms 27 are provided with adjusting screws 29 that bear against the gates for the purpose of regulating the throw of the gates. The lower ends of the gates are laterally disposed as illustrated at 30 for the purpose of controlling the movement of the potatoes out of the hoppers 6 into the magazines and said ends are provided with gravity actuated members 31 that prevent a too rapid movement or delivery of the potatoes from the hoppers 6 to the magazines.

It is to be noted that the gates 24ᵃ are alternatingly actuated by the cams or eccentrics on the shaft 18 and also that the pickers are alternatingly arranged so that they will impale or pick up the potatoes as they are discharged from the hoppers 6 into the magazines 11. The shaft 18 is rotated by a shaft 32 which receives its rotation from a shaft 33 and the latter is rotated by a shaft 34 journaled to brackets 35. A power shaft 36 is also journaled to the brackets 35 and may be rotated by a power source or manually if desired and is provided with a gear 37 that meshes with a gear wheel 38 secured to the shaft 34. A similar gear 39 is secured to the shaft 34 and the gears 38 and 39 are adapted for actuating the cutting mechanism.

The cutting mechanism 23 consists of a frame 40 divided into compartments 41 and 42 by partitions 43 and the compartment 41 has knife blades 44 arranged therein for the purpose of cutting a potato into quarters and the compartment 41 is adapted to receive the intermediate size of potatoes from the respective chute 20 while the compartment 42 has knife blades 45 arranged to cut the large size potatoes into sixths. The frame 40 yieldably supports guides 46 that receive the potatoes from the chutes 20 and position them properly over the knife blades. The potatoes are forced through the guides and knife blades by reciprocating plungers 47 that have their potato engaging faces recessed to receive the knife blades when said plungers reach the end of their working stroke so that the knife blades will entirely pass through the potatoes and consequently bring about a complete severing of the potatoes. The plungers 47 are pivotally connected to walking beams 48 which are pivoted to links 49 and the latter are pivoted to the gear wheels 38 and 39. The links 49 are so connected to said gear wheels 38 and 39 that the plungers are alternatingly actuated, or in other words, one of the plungers is on its working stroke, while the other plunger is on its non-working stroke. The plungers are guided in their vertical movement by links 50, to insure the plungers properly engaging the potatoes when starting on their downward or working strokes.

The severed potatoes fall from the knives onto an endless conveyor 50 arranged transversely of the machine and is adapted to convey the seed or severed potatoes to a point at one side of the machine for collection in a suitable receptacle. The conveyor 50 is driven by a sprocket chain 51 which receives its power from the shaft 33.

From the foregoing description taken in connection with the drawings, it should be apparent that this device is capable of grading the potatoes into the desired sizes and to deliver the different sized potatoes at proper intervals to cutting mechanisms which sever the potatoes into the proper sizes ready for planting. It is also to be noted that the potatoes when delivered from the cutting mechanism are caught and conveyed to one side of the machine so that they may be caught in a receptacle or receptacles and be transported manually or otherwise for planting.

A rod 53 is connected to the primary and secondary screens and to a crank 54 of the shaft 18 for the purpose of imparting to said screens the necessary vibration to cause the potatoes of a certain size to roll off of the screens and the smaller potatoes to pass through said screens.

While I have shown and described the preferred embodiment of my invention, it will be understood that minor changes in construction, combination and arrangement of parts may be made without departing from the spirit and scope of the invention as claimed.

Having thus described my invention what I claim is:—

1. A device of the class described comprising primary and secondary screens adapted to grade potatoes into different sizes, means for vibrating said screens, means delivering potatoes to one of said screens, hoppers receiving the graded potatoes from the screens, magazines associated with said hoppers, means controlling the movement of the potatoes from the hoppers to the magazines, cutters, means delivering potatoes one at a time from the magazines to the cutters.

2. A device of the character set forth comprising grading screens, a discharge chute receiving potatoes from one of said screens, hoppers receiving potatoes of different sizes from said screens, magazines associated with said hoppers, means controlling the movement of the potatoes from the hoppers to the magazines, rotary conveyors receiving potatoes from the magazines, and cutters receiving the potatoes from the conveyors.

3. A device of the character set forth comprising a grading mechanism, potato cutters, hoppers receiving the graded potatoes from the grading mechanism, magazines associated with said hoppers, means controlling the potatoes from the hoppers to the magazines and agitating the potatoes within the hoppers, and rotating pickers receiving potatoes from the magazines and delivering them to the cutters.

4. A device of the character set forth comprising a grading mechanism, hoppers associated with said grading mechanism, magazines associated with said hoppers, cutters, sets of picker arms rotatably mounted in the magazines, impaling pins carried by said picker arms and adapted to receive potatoes from the magazines, means controlling the potatoes from the hopper to the magazines, and chutes receiving the potatoes from the impaling pins and delivering them to the cutters.

5. A device of the character set forth comprising a grading mechanism, hoppers associated with said grading mechanism, a yieldingly mounted magazine associated with each of said hoppers, gates for controlling the potatoes from the hoppers to the respective magazines, cutters, and means to feed the potatoes one at a time from said magazines to said cutters.

6. A device of the character set forth comprising a grading mechanism, hoppers associated with said grading mechanism, a yieldingly mounted magazine associated with each of said hoppers, gates for controlling the potatoes from the hoppers to the respective magazines, said gates operating alternately, cutters, and means alternately feeding the potatoes from said magazines to said cutters one at a time.

7. A device of the character set forth comprising a grading mechanism, hoppers associated with said grading mechanism, a yieldingly mounted magazine associated with each of said hoppers, gates for controlling the potatoes from the hoppers to the respective magazines, cutters, means to feed the potatoes one at a time from said magazine to said cutters, and means adaptable to vary the throw of said gates.

In testimony whereof I affix my signature in presence of two witnesses.

CHRIS M. KNUTSON.

Witnesses:
J. F. TILLMAN,
N. O. TORGERSON.